June 4, 1968 R. L. BRONNES 3,386,906
TRANSISTOR BASE AND METHOD OF MAKING THE SAME
Filed Nov. 26, 1965
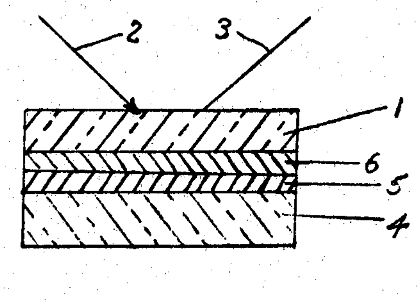
INVENTOR.
ROBERT L. BRONNES
BY Frank R. Trifari
AGENT

United States Patent Office 3,386,906

Patented June 4, 1968

3,386,906

TRANSISTOR BASE AND METHOD OF MAKING THE SAME

Robert L. Bronnes, Irvington, N.Y., assignor to North American Philips Company, Inc., New York, N.Y., a corporation of Delaware Filed Nov. 26, 1965, Ser. No. 509,937
3 Claims. (Cl. 204—192)

My invention relates to a method of manufacturing a base suitable for a semi-conductive body such as a transistor and to a conductive base support for such a semi-conductive body. While the method is adapted to the production of seals of various known geometries, it is especially advantageous for producing metallized ceramic transistor bases.

In accordance with the invention, a ceramic such as alumina is metallized by cathodic sputtering with successive layers of niobium and nickel. The metallized ceramic is then heated in vacuum, hydrogen, cracked ammonia or other non-oxidizing atmosphere to interdiffuse the niobium and nickel. A final layer of gold is applied to the metallized ceramic by cathodic sputtering to provide a surface compatible with the semi-conductor component, to which the semi-conductor component may be joined with or without the use of solder, or braze metals, or alloys.

The invention will be described with reference to the accompanying drawing in which the sole figure shows a transistor device made in accordance with the invention.

A semi-conductive body 1 provided with emitter and collector electrodes 2 and 3 is secured to a ceramic base 4, such as silicon which has been metallized according to the invention.

In accordance with the method of invention, thin layers of niobium and nickel are first deposited on the surface of the ceramic body 4 by cathodic sputtering as described in a copending application, Ser. No. 301,866, filed Aug. 13, 1963.

These layers are then heated to a temperature of about 1100° to 1200° C. for one-half hour in a non-oxidizing atmosphere, viz. vacuum, hydrogen or cracked ammonia to interdiffuse the layers of niobium and nickel and form an interdiffused layer 5 of niobium and nickel.

Over this layer 5 of interdiffused niobium and nickel a final layer of gold 6 is also deposited by cathodic sputtering as described in said co-pending application.

The semi-conductive body 1 is then placed on the gold layer and joined with it using solder or braze metals by heating the assembly to the melting point of the solder or braze metal. This operation may be carried out in air which is one of the advantages of this invention.

If desired, the metallized ceramic may be patterned to produce conductive areas separated by non-conductive areas by mechanical masking. Alternatively, this may be accomplished by removing from those areas in which metal is unwanted by grinding, abrasion, or etching. Lead wires may be joined to the metallized ceramic by ultrasonic welding, diffusion bonding or brazing.

Therefore, while the invention has been described with reference to particular examples and applications thereof, other modifications will be apparent to those skilled in the art without departing from the spirit and scope of the invention as defined in the appended claims.

What is claimed is:

1. A method of manufacturing a conductive base for a semi-conductive body comprising the steps of depositing on the surface of a ceramic body by cathodic sputtering successive layers of niobium and nickel, heating the so-coated surface of the ceramic in a non-oxidizing atmosphere to interdiffuse the niobium and nickel, and applying to the so-coated surface a layer of gold by cathodic sputtering.

2. A method of manufacturing a conductive base for a semi-conductive body as claimed in claim 1 in which the non-oxidizing atmosphere is hydrogen or cracked ammonia.

3. A method of manufacturing a conductive base for a semi-conductive body as claimed in claim 1 in which the metallized surface of the semi-conductive body is heated in vacuum to interdiffuse the niobium and nickel.

References Cited

UNITED STATES PATENTS

| | | | |
|---|---|---|---|
| 3,208,835 | 9/1965 | Duncan et al. | 117—217 |
| 3,218,194 | 11/1965 | Maissel | 204—192 |
| 3,239,376 | 3/1966 | Schmidt | 117—217 |
| 3,256,588 | 6/1966 | Sikina et al. | 117—217 |
| 3,324,019 | 6/1967 | Laegreid et al. | 204—192 |
| 3,325,258 | 6/1967 | Fottler et al. | 204—192 |

ROBERT K. MIHALEK, *Primary Examiner.*